(12) United States Patent
Wu et al.

(10) Patent No.: US 8,780,997 B2
(45) Date of Patent: Jul. 15, 2014

(54) REGULATION OF DECODE-SIDE PROCESSING BASED ON PERCEPTUAL MASKING

(75) Inventors: Hsi-Jung Wu, San Jose, CA (US); Thomas Pun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1611 days.

(21) Appl. No.: 11/462,562

(22) Filed: Aug. 4, 2006

(65) Prior Publication Data

US 2007/0116124 A1 May 24, 2007

Related U.S. Application Data

(60) Provisional application No. 60/737,805, filed on Nov. 18, 2005.

(51) Int. Cl.
| | |
|---|---|
| H04N 7/12 | (2006.01) |
| H04N 11/02 | (2006.01) |
| H04N 11/04 | (2006.01) |
| G06K 9/36 | (2006.01) |
| G06K 9/46 | (2006.01) |

(52) U.S. Cl.
USPC ............ 375/240.25; 375/240.15; 375/240.16; 375/240.17; 382/236; 382/239; 382/250

(58) Field of Classification Search
USPC .................................................. 375/240.25
See application file for complete search history.

(56) References Cited

U.S. PATENT DOCUMENTS

| | | | |
|---|---|---|---|
| 3,716,851 A | 2/1973 | Neumann | |
| 4,023,110 A | 5/1977 | Oliver | |
| 4,131,765 A | 12/1978 | Kahn | |
| 4,217,609 A | 8/1980 | Hatori et al. | |
| 4,394,774 A | 7/1983 | Widergren et al. | |
| 4,437,119 A | 3/1984 | Matsumoto et al. | |
| 4,670,851 A | 6/1987 | Murakami et al. | |
| 4,698,672 A | 10/1987 | Chen et al. | |
| 4,760,446 A | 7/1988 | Ninomiya et al. | |
| 4,837,618 A | 6/1989 | Hatori et al. | |
| 4,864,393 A | 9/1989 | Harradine | |
| 4,901,075 A | 2/1990 | Vogel | |
| 5,010,401 A | 4/1991 | Murakami et al. | |
| 5,021,879 A | 6/1991 | Vogel | |
| 5,068,724 A | 11/1991 | Krause et al. | |
| 5,091,782 A | 2/1992 | Krause et al. | |
| 5,093,720 A | 3/1992 | Krause et al. | |
| 5,113,255 A | 5/1992 | Nagata et al. | |

(Continued)

OTHER PUBLICATIONS

"Coding of Moving Pictures and Associated Audio Information", ISO/JEC JTC1/SC29WG11 Video Group, Feb. 1996.

(Continued)

*Primary Examiner* — Hee-Yong Kim
(74) *Attorney, Agent, or Firm* — Kenyon & Kenyon LLP (57) ABSTRACT

This invention is directed to a method for decoding coded video data in which decoder performance is regulated based on perceptual masking. The method includes, upon receipt of coded video data, applying the coded video data to a multi-stage decoding process; computing perceptual masking measures for the coded video data; and switching a stage of the decoding process to a lower performance level based on the computed perceptual masking measures. The method may be applied to non-reference frames and reference frames with low numbers of dependent frames. The method provides scalability among decoders to allow for various decoder and/or coded data complexity.

25 Claims, 8 Drawing Sheets

(56) References Cited

U.S. PATENT DOCUMENTS

| | | | |
|---|---|---|---|
| 5,168,375 A | 12/1992 | Reisch et al. | |
| 5,175,618 A | 12/1992 | Ueda et al. | |
| 5,223,949 A | 6/1993 | Honjo | |
| 5,260,783 A | 11/1993 | Dixit | |
| 5,293,229 A | 3/1994 | Iu | |
| 5,298,991 A | 3/1994 | Yagasaki et al. | |
| 5,317,397 A | 5/1994 | Odaka et al. | |
| 5,329,318 A | 7/1994 | Keith | |
| 5,343,248 A | 8/1994 | Fujinami | |
| 5,377,051 A | 12/1994 | Lane et al. | |
| 5,412,430 A | 5/1995 | Nagata | |
| RE34,965 E | 6/1995 | Sugiyama | |
| 5,428,396 A | 6/1995 | Yagasaki et al. | |
| RE35,093 E | 11/1995 | Wang et al. | |
| 5,469,208 A | 11/1995 | Dea | |
| 5,469,212 A | 11/1995 | Lee | |
| RE35,158 E | 2/1996 | Sugiyama | |
| 5,497,239 A | 3/1996 | Kwon | |
| 5,510,840 A | 4/1996 | Yonemitsu et al. | |
| 5,539,466 A | 7/1996 | Igarashi et al. | |
| 5,543,843 A | 8/1996 | Kato | |
| 5,543,847 A | 8/1996 | Kato | |
| 5,552,832 A * | 9/1996 | Astle | 375/240.24 |
| 5,557,330 A | 9/1996 | Astle | |
| 5,559,557 A | 9/1996 | Kato | |
| 5,565,920 A | 10/1996 | Lee et al. | |
| 5,568,200 A | 10/1996 | Pearlstein et al. | |
| 5,587,806 A | 12/1996 | Yamada et al. | |
| 5,625,355 A | 4/1997 | Takeuo et al. | |
| 5,648,733 A | 7/1997 | Worrell et al. | |
| 5,654,706 A | 8/1997 | Jeong | |
| 5,666,461 A | 9/1997 | Igarashi et al. | |
| 5,684,534 A | 11/1997 | Harney et al. | |
| 5,703,646 A | 12/1997 | Oda | |
| 5,711,012 A | 1/1998 | Bottoms et al. | |
| 5,719,986 A | 2/1998 | Kato et al. | |
| 5,831,688 A | 11/1998 | Yamada et al. | |
| 5,841,939 A | 11/1998 | Takahashi et al. | |
| 5,852,664 A | 12/1998 | Iverson et al. | |
| 5,887,111 A | 3/1999 | Takahashi et al. | |
| 5,917,954 A | 6/1999 | Girod et al. | |
| 5,946,043 A | 8/1999 | Lee et al. | |
| 5,949,948 A | 9/1999 | Krause et al. | |
| 5,991,447 A | 11/1999 | Eifrig et al. | |
| 5,991,503 A | 11/1999 | Miyasaka et al. | |
| 6,052,507 A | 4/2000 | Niida et al. | |
| 6,064,776 A | 5/2000 | Kikuchi et al. | |
| 6,081,296 A | 6/2000 | Fukunaga et al. | |
| 6,081,551 A | 6/2000 | Etoh | |
| RE36,761 E | 7/2000 | Fujiwara | |
| 6,088,391 A | 7/2000 | Auld et al. | |
| 6,115,070 A | 9/2000 | Song et al. | |
| 6,125,146 A | 9/2000 | Frencken et al. | |
| 6,141,383 A | 10/2000 | Yu | |
| 6,144,698 A | 11/2000 | Poon et al. | |
| 6,167,087 A | 12/2000 | Kato | |
| 6,169,821 B1 | 1/2001 | Fukunaga et al. | |
| 6,188,725 B1 | 2/2001 | Sugiyama | |
| 6,217,234 B1 | 4/2001 | Dewar et al. | |
| 6,256,420 B1 | 7/2001 | Sako et al. | |
| 6,563,549 B1 | 5/2003 | Sethuraman | |
| 6,985,635 B2 * | 1/2006 | Chen et al. | 382/250 |
| 2002/0161809 A1 * | 10/2002 | Lan et al. | 708/402 |
| 2003/0021482 A1 * | 1/2003 | Lan et al. | 382/236 |
| 2003/0095603 A1 * | 5/2003 | Lan et al. | 375/240.17 |
| 2003/0198293 A1 * | 10/2003 | Chen et al. | 375/240.16 |
| 2004/0190610 A1 * | 9/2004 | Song et al. | 375/240.03 |
| 2004/0240549 A1 * | 12/2004 | Cote et al. | 375/240.15 |
| 2005/0286631 A1 | 12/2005 | Wu et al. | |
| 2006/0013298 A1 | 1/2006 | Tong et al. | |
| 2006/0193527 A1 * | 8/2006 | Kalva et al. | 382/239 |
| 2006/0215768 A1 * | 9/2006 | Kerofsky | 375/240.28 |
| 2006/0251330 A1 * | 11/2006 | Toth et al. | 382/236 |

OTHER PUBLICATIONS

K.T. Tan and Mohammad Ghanbari, "A multi-metric objective picture-quality measurement model for MPEG model," IEEE Trans. on Circuits and Systems for Video Technology, Oct. 2000, pp. 1208-1213, vol. 10, No. 7.

Atul Puri and R. Aravind, "Motion-compensated video coding with adaptive perceptual quantization," IEEE Trans. on Circuits and Systems for Video Technology, Dec. 1991, pp. 351-361, vol. 1, No. 4.

Soon Hie Tan, K.K. Pang, and K.N. Ngan, "Classified perceptual coding with adaptive quantization," IEEE Trans. on Circuits and Systems for Video Technology, Aug. 1996, pp. 375-388, vol. 6, No. 4.

Sanghoon Lee, M.S. Pattichis, and A.C. Bovik, "Foveated video compression with optimal rate control," IEEE Trans. on Image Processing, Jul. 2001, pp. 977-992, vol. 10, No. 7.

Puri & Chen, editors, Multimedia Systems, Standards, and Networks, Chapter 3, pp. 55-64, Marcel Dekker, Inc., New York, 2000.

Mitchell, Joan.; Pennebaker, William B.; Fogg, Chad E.; and LeGall, Didier J.; "MPEG Video Compression Standard" Digital Multimedia Standards Series, pp. 17-32 and 81-103, 333-356.

Haskell, Barry G.; Puri, Atul; and Netravali, Arun N.; "Digital Video: An Introduction to MPEG-2", Digital Multimedia Standards Series, pp. 33-39, 40-411.

* cited by examiner

REGULATION OF DECODE-SIDE PROCESSING BASED ON PERCEPTUAL MASKING

CROSS REFERENCE TO RELATED APPLICATIONS

This application claims priority to U.S. Provisional Patent Application No. 60/737,805 filed on Nov. 18, 2005, herein incorporated by reference in its entirety.

BACKGROUND

Video decoders vary broadly in processing power, speed, storage capacity, and video quality. For example, a decoder may have lower processing power capabilities with just enough to decode an average video sequence of acceptable quality. Whereas, a decoder with higher processing power capabilities is likely to have little trouble providing a video sequence of acceptable quality, but has excess unused power.

One way to regulate the various decoders is to provide different decoding processes for the different decoders. However, the impracticality of maintaining different decoding processes is prohibitively expensive and labor-intensive. Therefore, a standard decoding process that is scalable to regulate various decoders' capabilities is preferred.

Such a scalable decoding process should efficiently allocate power to produce acceptable video quality for both lower and higher power decoders. In higher power decoders, the efficiently allocated decoding process may result in additional power for other functions of the decoder.

Conventional processes for decoder power allocation react to the decoding timeliness of the sequence, rather than to the power capabilities of the decoder itself. That is, the processes adjust only when it is highly likely that display of a decoded sequence will be delayed. However, the adjustments often take effect too slowly or demand too much power too quickly, which is problematic for any decoder, particularly lower power decoders.

Accordingly, there is a need in the art for a way to regulate decode-side processing for various video decoders having various power capabilities.

DETAILED DESCRIPTION

Embodiments of the present invention provide a method for regulating decode-side processing in order to efficiently expend decoder processing power to assist timely display of decoded video sequences. The method uses perceptual masking properties of the video sequence to determine how much decoder processing power may be used to decode the sequence. A perceptual masking measure indicates where or when noise may be introduced into a decoded video sequence and be masked, i.e., caused to be visually acceptable, by the properties of the decoded sequence. Perceptual masking properties may be used to disregard or alter some encoded bits with little perceptual alteration of the quality of the decoded sequence.

Examples of perceptual masking properties include how long video frames are expected to display, quantization parameters, bits used to code each frame and/or portions thereof, residual energy, motion vectors, statistics of macroblock types, frame type (I, P, B), and other data related to the frame of interest and its neighbors. The method uses these properties to regulate the amount of processing power used to decode each frame and the level to which the decoder accurately decodes each frame.

This method advantageously allows the decoder to reserve processing power even when there is not likely to be a delay, thereby reserving power for future computationally heavy decoding and/or for other processes. This method also frees up decoder traffic for processing more complex sequences or other processes and may be used in conjunction with other forms of decode-side processing regulation.

Generally, encoders use a video coding standard to effectively and efficiently encode a video sequence prior to transmission to a decoder. The encoder may use several different types of image frames in the encoded sequence.

One type of frame is an intra (I) frame, in which each pixel of the frame may be coded without using any information from another frame. I frames are typically coded at the beginning of a group of pictures (GOP) in the sequence or at a first frame after a scene change.

Another type of frame is a predicted (P) frame, in which each pixel of the frame may be coded using predictions from at most one reference frame, e.g., a reference I frame, a reference P frame, or a reference B frame. A P frame may depend on either a preceding or a subsequent reference frame.

A third type of frame is a bidirectional (B) frame, in which each pixel of the frame may be coded using predictions from one or more reference frames, e.g., a reference I frame, a reference P frame, a reference B frame, or a combination thereof. A B frame may depend on both preceding and subsequent reference frames.

Because P and B frames may depend on subsequent reference frames, the encoding and transmission order of frames may be different from the display order.

Figure 1A:
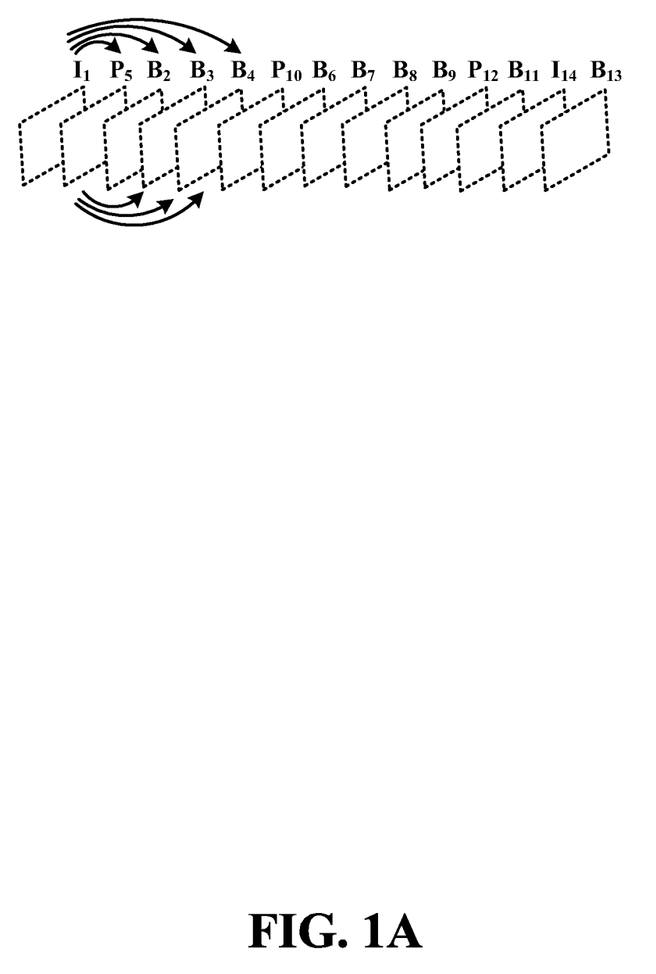
FIG. 1A is an example of encoded frames of a video sequence, indicating the encoding and transmission order and the use of information from other frames to encode a frame.

FIG. 1A illustrates a coded video sequence having I, P, and B frames and their encoding and transmission order. Arrows indicate the frames from which information is used to code the frames. $I_1$ is encoded first. No information from another frame is used to code $I_1$. $P_5$ is coded next, predicting the fifth frame of the sequence. Information from $I_1$, is used to code $P_5$. $B_2$, $B_3$ and $B_4$ are coded next, predicting the respective second, third, and fourth frames of the sequence. Information from preceding frame $I_1$ and subsequent frame $P_5$ are used to code $B_2$, $B_3$, and $B_4$. $P_5$ will display after the B frames, but is coded before, in this example, so that information from $P_5$ may be used to code the B frames.

Frames whose information is used to code other frames are known as reference frames. Frames whose information is not used to code other frames are known as non-reference frames. In FIG. 1A, frames $I_1$ and $P_5$ are reference frames and frames $B_2$, $B_3$, and $B_4$ are non-reference frames.

Figure 1B:
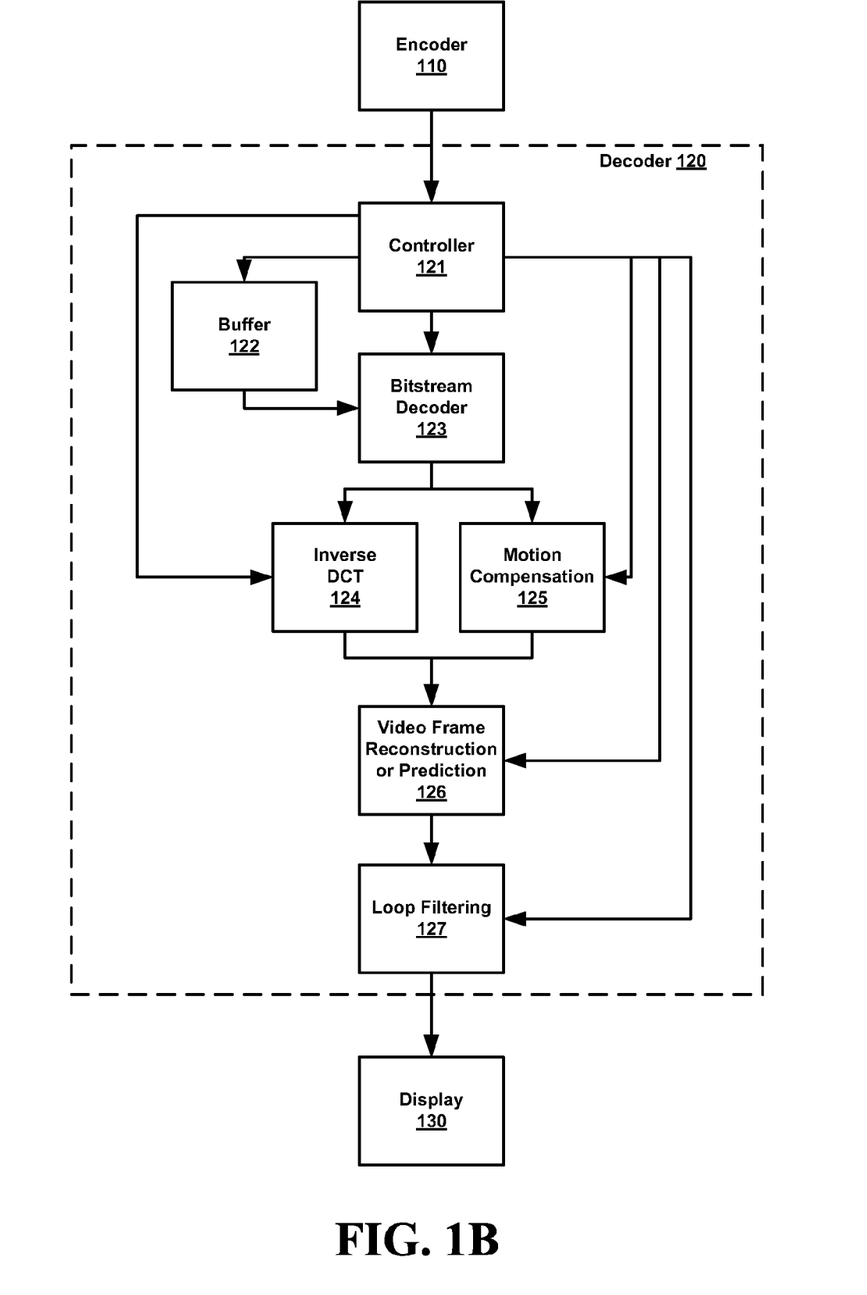
FIG. 1B is an example of a standard decoder.

FIG. 1B is a block diagram of a standard decoder. Decoding may be a multi-stage process including several stages to decode a coded video sequence. A decoder 120 may receive a coded bitstream representing a video sequence from an encoder 110. The decoder 120 may decode the bitstream and reconstruct the video sequence. The decoder 120 may then send the video sequence to a display 130 for viewing.

At the decoder 120, a controller 121 may receive the coded bitstream from the encoder 110. The controller 121 may control the operation of the remaining stages of the decoder 120 by transmitting signals and/or data to the stages for execution. A buffer 122 may temporarily store the coded bitstream when the downstream stages are experiencing decoding delays. The buffer 122 may then feed the coded bitstream to a bitstream decoder 123. Alternatively, if there are no delays, the controller 121 may directly feed the coded bitstream to the bitstream decoder 123, bypassing the buffer 122.

The bitstream decoder 123 may decode the bitstream using standard decoding techniques. The decoded bitstream may include DCT coefficients and motion vectors for each frame of the video sequence. The DCT coefficients may indicate the complexity of the frame. The motion vectors may indicate the difference between the frame and a related frame, i.e., its reference frame.

An inverse DCT stage 124 may receive the DCT coefficients from the bitstream decoder 123 and convert the coefficients into the pel values of the original frame. A motion compensation stage 125 may receive the motion vectors from the bitstream decoder 123 and determine how much data in the frame has moved from its previous position in the reference frame, i.e., the motion displacement of the data.

A video frame reconstruction/prediction stage 126 may receive the pel values from the inverse DCT stage 124 and the motion displacement data from the motion compensation stage 125. The reconstruction/prediction stage 126 may use the received pel values to reconstruct I frames and both the received pel values and motion displacement data to predict P and B frames. The result is decoded frames of the video sequence.

A loop filter 127 may receive the decoded frames of the video sequence from the reconstruction/prediction stage 126. The loop filter 127 may perform some post-processing on the decoded frames to remove artifacts due to the standard block-based coding techniques of the encoder 110. The loop filter 127 may then send the sequence to the display 130.

Figure 2A:
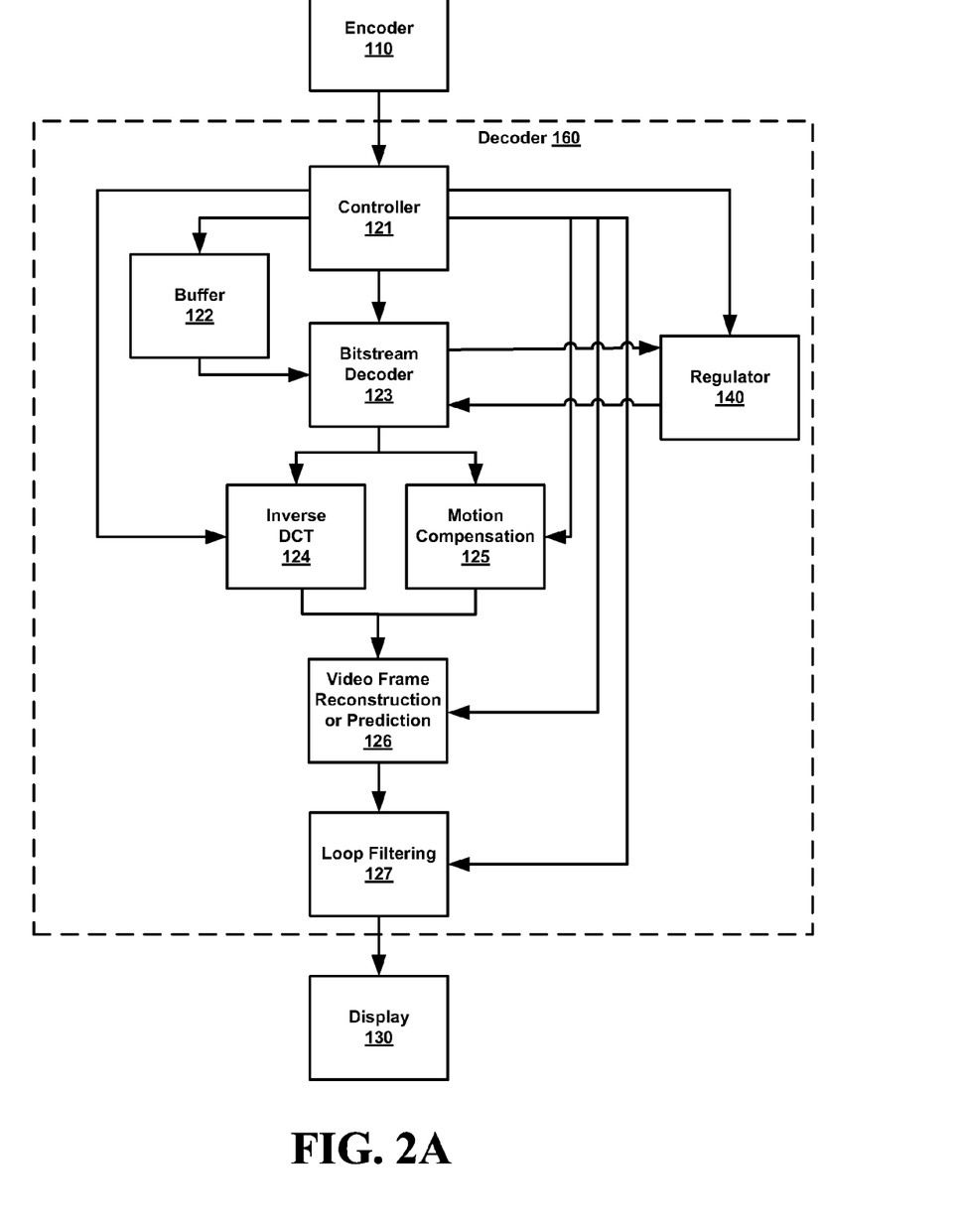
FIG. 2A is a block diagram of a decoder according to an embodiment of the present invention.

FIG. 2A is a block diagram of a decoder according to an embodiment of the present invention. The decoder 160 may include the stages of a standard decoder, as in FIG. 1B, with an additional stage, a regulator 140, for regulating decode-side processing according to embodiments of the present invention.

The controller 121 may control the regulator 140 as it does the other stages of the decoder 160. The bitstream decoder 123 may send the coded bitstream to the regulator 140. In an alternate embodiment, the bitstream decoder 123 may decode all or portions of the bitstream before sending the bitstream to the regulator 140.

The regulator 140 may determine how the received data is to be further processed in order to reduce the amount of decoding the decoder 160 has to do. For example, the regulator 140 may determine that certain stages of the decoder 160 are to be omitted or that certain data, e.g., the DCT coefficients and the motion vectors, is not to be processed by the stages. That is, the regulator 140 may determine the perceptual masking measures to be used to lower the performance level of the decoder 160 for certain stages and/or data.

For example, if the regulator 140 determines that a particular frame of the video sequence is not to be decoded at all, the regulator 140 may insert a flag into the affected data such that, upon receiving the data back from the regulator 140, the bitstream decoder 123 may detect the flag and switch off for the affected data. Or, if the regulator 140 determines that loop filtering is not to be performed on certain data, the regulator 140 may insert a flag into the affected data such that, upon receipt, the loop filter 127 may detect the flag and switch off for the affected data. Or, if the regulator 140 determines that certain DCT coefficients are not needed in order to maintain an acceptable video quality, the regulator 140 may insert a flag into the affected data such that, upon receipt, the inverse DCT stage 124 may detect the flag and switch its processing to discard the affected DCT coefficients. Or, if the regulator 140 determines that certain motion vectors are not needed to maintain an acceptable video quality, the regulator 140 may insert a flag into the affected data such that, upon receipt, the motion compensation stage 125 may detect the flag and switch its processing to modify its motion compensation computations from the affected motion vectors. Similarly, the regulator 140 may insert a flag into affected data such that, upon receipt, the video frame reconstruction or prediction stage 126 may switch how it reconstructs or predicts frames from the affected data.

After determining how the data from the bitstream decoder 123 is to be processed and then modifying the data accordingly, the regulator 140 may return the modified data to the bitstream decoder 123, which may then decode the modified data, if needed, and send the decoded data on to the remaining stages of the decoder 160.

Figure 2B:
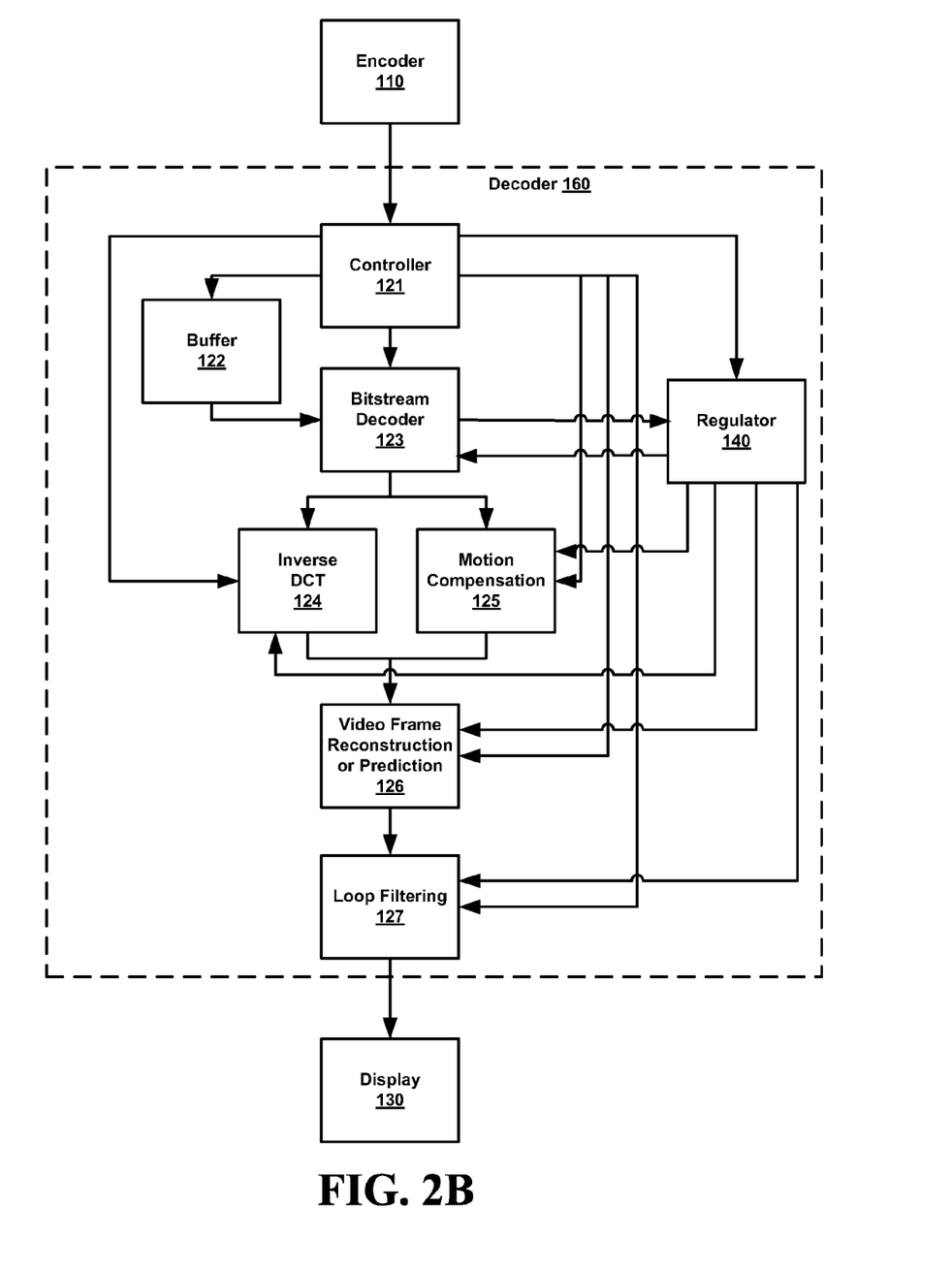
FIG. 2B is a block diagram of a decoder according to another embodiment of the present invention.

FIG. 2B is a block diagram of a decoder according to another embodiment of the present invention. In this embodiment, the bitstream decoder 123 may send the coded bitstream to the regulator 140. Alternatively, the bitstream decoder 123 may decode all or portions of the bitstream before sending the bitstream to the regulator 140. The regulator 140 may determine from the received data that certain stages of the decoder 160 are to be omitted or that certain data is not to be processed by a particular stage based on perceptual masking measures. The regulator 140 may then control the affected stage directly, causing that stage to switch to a lower performance level based on determined perceptual masking measures. The regulator 140 may control the affected stage by sending a control signal to the stage to switch to a lower performance level when perceptual masking used and by sending a subsequent control signal to the stage to switch back to a regular performance level when perceptual masking not used.

For example, the regulator 140 may send a control signal to the bitstream decoder 123, the coop filter 127, the inverse DCT stage 124, the motion compensation stage 125, and/or the video frame reconstruction or prediction stage 126 to switch its processing to the lower performance level, for example, as described above when that stage processes the affected data. The regulator 140 may send any one or more of the control signals simutaneously, sequentially, or in any manner in accordance with embodiments of the present invention.

It is to be understood that the decoders of FIGS. 2A and 2B are for illustration purposes, as many different configurations may be used to perform the decoding according to embodiments of the present invention.

Figure 3:
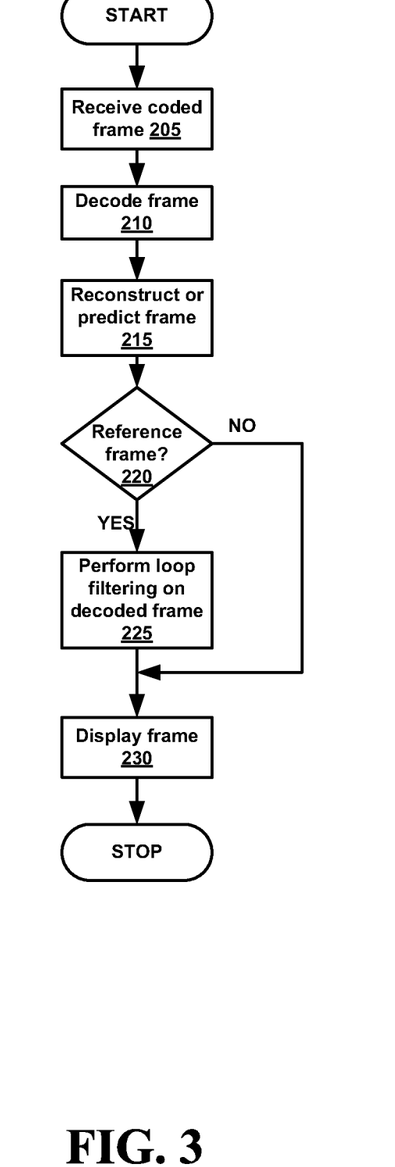
FIG. 3 is a flowchart of a method according to an embodiment of the present invention for regulating decode-side processing based on block-based artifacts from a coded sequence.

FIG. 3 is a flowchart of a method according to an embodiment of the present invention for regulating decode-side processing in which loop fittering may be omitted for non-reference frames. In this method, the perceptual masking property may include the block-based artifacts in the decoded frames.

As stated previously, loop fittering is a post-processing stage used on decoded frames to reduce artifacts generated by block-based encoding. Since information from non-reference frames is not used to code other frames, the likelihood of error propagation from the non-reference frames to other frames is eliminated. To conserve processing expense, loop filtering may not be necessary for these non-reference frames since information from these frames is not be propagated to other frames. When loop filtering is omitted, the decoder expends less processing resources, which remain available for decoding additional frames.

In FIG. 3, the decoder may receive (205) a coded frame from the encoder. The decoder may then decode (210) the frame using standard decoding techniques. The decoder may reconstruct or predict (215) the frame to be displayed therefrom. The decoder may determine (220) whether the decoded frame is a reference frame or a non-reference frame.

If the frame is a reference frame (220), the loop filtering stage may be performed (225) on the frame to reduce block-based artifacts. For a non-reference frame, loop filtering may be omitted. The decoder may display (230) the resulting frame. The method may repeat for all the frames in the coded sequence.

Similarly, in another embodiment, the decoder may use perceptual masking measures to decide not to decode a particular frame at all. In this embodiment, the decoder may omit bitstream decoding for that frame.

Figure 4:
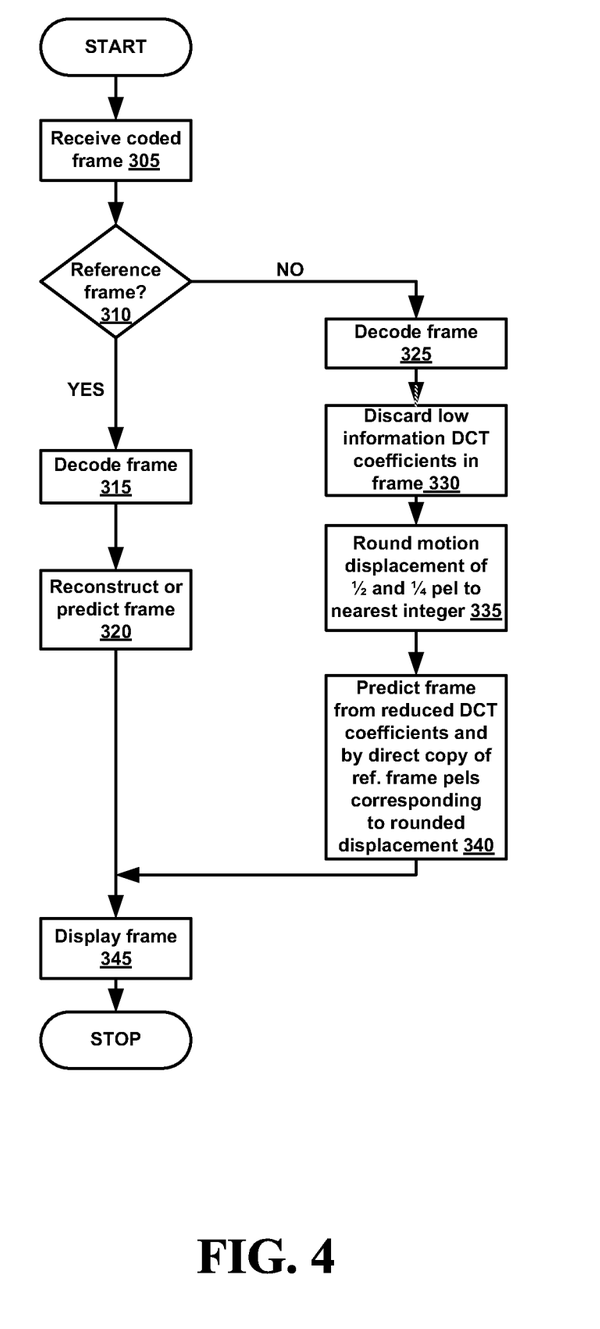
FIG. 4 is a flowchart of another method according to an embodiment of the present invention for regulating decode-side processing based on low information areas in a coded sequence.

FIG. 4 is a flowchart of another method according to an embodiment of the present invention for regulating decode-side processing in which non-reference frames are decoded at lower quality. In this method, the perceptual masking properties may include residual energy, i.e., DCT coefficients, and motion vectors. As mentioned previously, since the likelihood of error propagation from non-reference frames may be eliminated, the non-reference frames may be decoded at a lower quality.

In FIG. 4, the decoder may receive (305) a coded frame from the encoder. The decoder may determine (310) whether the received frame is a reference frame. If the frame is a reference frame (310), the decoder may decode (315) the frame using standard decoding techniques and reconstruct or predict (320) the frame to be displayed therefrom.

If the frame is a non-reference frame (310), the decoder may only partially perform the decoding process on the non-reference frame in order to save decoder power and time. In this embodiment, the decoder may decode (325) the frame. The decoder may then discard (330) DCT coefficients in the coded frame that have little information. These discarded coefficients generally represent frame information with lower spatial frequencies, indicative of very little visual activity. This reduces the number of inverse DCT conversions that the decoder has to make.

The decoder may perform motion compensation, which is computationally expensive, to predict the motion displacement of the blocks in the decoded frame from their position in the reference frame. As such, rather that computing pel values with ½ and ¼ pel displacement, the decoder may be round (335) the motion displacement to the nearest integer, i.e., a whole pel displacement. As a result, it is much simpler for the decoder to predict the frame because the decoder need not process all the DCT coefficients or perform complex motion compensation to get an aggregate pel value from neighboring pels around the fraction displacements. Rather, the decoder may predict (340) the frame from a reduced number of DCT coefficients and directly copy, into the decoded frame, the pels of the reference frame that correspond to the rounded displacement.

The decoder may display (345) the resulting frame. The method may repeat for all the frames in the coded sequence.

Figure 5:
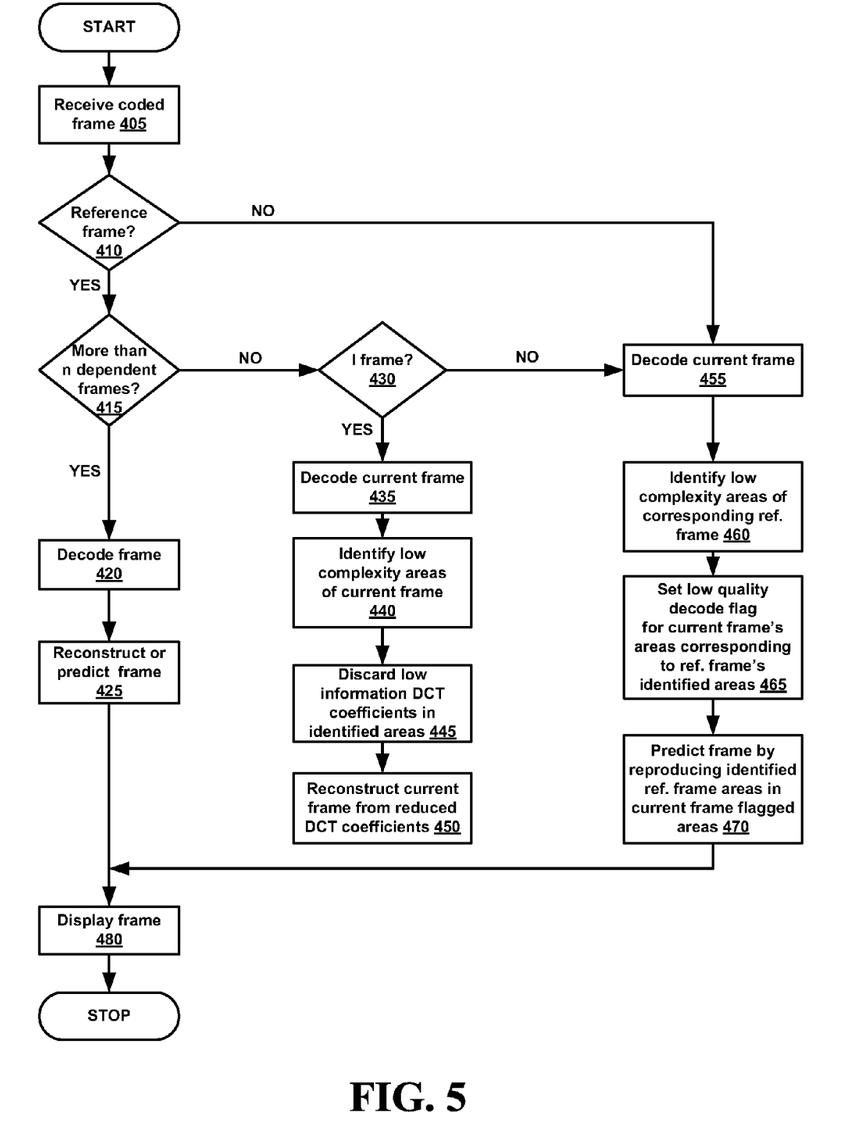
FIG. 5 is a flowchart of still another method according to an embodiment of the present invention for regulating decode-side processing based on low complexity areas of a coded sequence.

FIG. 5 is a flowchart of still another method according to an embodiment of the present invention for regulating decode-side processing in which non-reference frames and reference frames with low numbers of dependent frames are decoded at lower quality. In this method, the perceptual masking properties may include residual energy and visual complexity. This reduces the likelihood of error propagation from these above-mentioned frames due to the lower decoded quality.

In FIG. 5, the decoder may receive (405) a coded frame from the encoder. The decoder may determine (410) whether the received frame is a reference frame. If the frame is a reference frame (410), the decoder may determine (415) whether the reference frame has a low number n or fewer of dependent frames. If the number of dependent frames is more than n(415), the decoder may decode (420) the frame using standard decoding techniques and reconstruct or predict (425) the frame to be displayed therefrom.

If the reference frame does have n or less dependent frames (415), the decoder may determine (430) whether the reference frame is an I, P, or B frame. If the reference frame is an I frame (430), the decoder may decode (435) the frame. The decoder may identify (440) the low complexity areas of the frame. This identification may be made based on the DCT coefficient values or any such parameter to indicate low complexity in the frame. The decoder may discard (445) the DCT coefficients corresponding to these tow complexity areas and reconstruct (450) the frame using the remaining DCT coefficients.

If the reference frame is a P or B frame (430), the decoder may decode (455) the frame. The decoder may identify (460) low complexity areas of the P or B frame's reference frame. The decoder may set (465) flags in the areas of the current P or B frame corresponding to tow complexity areas of its reference frame. As a result, it is much simpler for the decoder to predict the P or B frame because the decoder need not process all the DCT coefficients or perform complex motion compensation for the entire frame. Rather, the decoder may predict (470) the frame by reproducing the identified low complexity areas from the reference frame into the flagged areas of the current P or B frame.

For non-reference frames (410), the decoder may execute routines (455) through (470).

The decoder may display (480) the resulting frame. The method may repeat for all the frames in the coded sequence.

In an alternate embodiment, the method of FIG. 5 may be applied to frame regions, as well as to the frame itself.

In another alternate embodiment, methods according to embodiments of the present invention may be used in conjunction with conventional decoding methods to improve the decode-side processing of the conventional methods.

In still another alternate embodiment, the encoder's behavior may be taken into account when regulating decode-side processing. The encoder may encode a region of pels in such a way that error is not propagated throughout the video sequence. For example, the encoder may rearrange the ordering of the I, P, and B frames to manage dependencies on reference frames, thereby managing the number of dependent frames and/or frame regions into which errors could propagate. The decoder may then use knowledge of the encoder's behavior to regulate the amount of decode-side processing to avoid error propagation.

Figure 6:
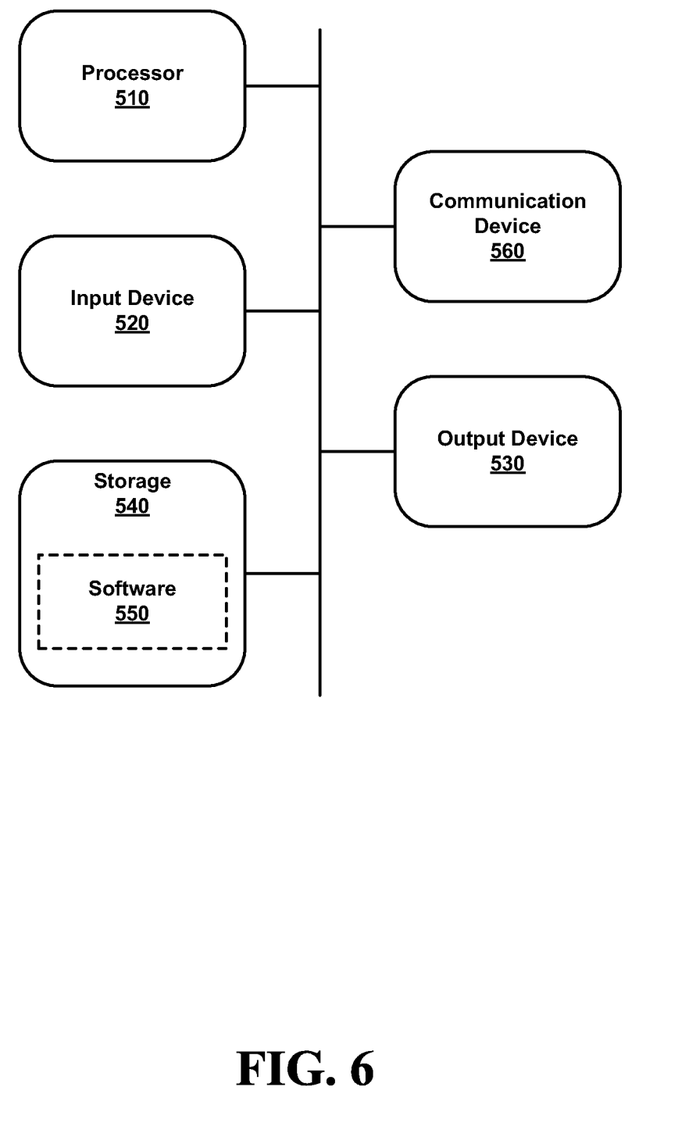
FIG. 6 illustrates a computer system upon which embodiments of the present invention may be implemented.

FIG. 6 illustrates the components of a basic computing device in accordance with an embodiment of the present invention. The computing device may be a personal computer, workstation, handheld personal digital assistant ("PDA"), or any other type of microprocessor-based device. The computing device may include one or more of processor 510, input device 520, output device 530, storage 540, and communication device 560.

Input device 520 may include a keyboard, mouse, pen-operated touch screen or monitor, voice-recognition device, or any other device that provides input. Output device 530 may include a monitor, printer, disk drive, speakers, or any other device that provides output.

Storage 540 may include volatile and nonvolatile data storage, including one or more electrical, magnetic or optical memories such as a RAM, cache, hard drive, CD-ROM drive, tape drive or removable storage disk. Communication device 560 may include a modem, network interface card, or any other device capable of transmitting and receiving signals over a network. The components of the computing device may be connected via an electrical bus or wirelessly.

Software 550, which may be stored in storage 540 and executed by processor 510, may include, for example, the decoding process that embodies the functionality of the present invention.

The computing device may implement any operating system, such as Windows or UNIX. Software 550 may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

The invention claimed is:

1. A method for decoding coded video data, comprising:
   upon receipt of coded video data at a decoder, applying the coded video data to a multi-stage decoding process;
   computing with the decoder perceptual masking measures for the coded video data wherein a perceptual masking measure indicates that errors introduced into the coded video data when decoded at a lower performance level are acceptable;
   for coded video data having a perceptual masking measure indicating that decoding at a lower performance level is acceptable, inserting, with the decoder, a flag into the coded video data to signal to the decoding stage that a lower performance level should be used during the decoding process;
   identifying reference frames with fewer than a predetermined number of dependent frames from among the coded video data; and
   based on the flag, switching a stage of the decoding process in the decoder to a lower performance level for the identified reference frames.

2. The method of claim 1, wherein the switching comprises:
   switching a bitstream decoder stage of the decoding process to skip decoding of portions of the coded video data.

3. The method of claim 1, wherein the switching comprises:
   switching a loop filtering stage of the decoding process to ignore blocking artifacts in the coded video data.

4. The method of claim 1, wherein the switching comprises:
   switching an inverse DCT stage of the decoding process to discard DCT coefficients having little or no information about the coded video data.

5. The method of claim 1, wherein the switching comprises:
   switching a motion compensation stage of the decoding process to round motion vectors to a nearest integer; and
   copying data from a previously decoded reference frame according to the rounded motion vectors into the coded video data.

6. The method of claim 1, wherein the switching comprises:
   switching an inverse DCT stage of the decoding process to flag DCT coefficients representing low complexity areas of the coded video data; and
   copying data from a previously decoded reference frame according to the flagged DCT coefficients into the coded video data.

7. The method of claim 1, wherein the switching for the identified reference frames comprises:
   if the identified reference frames are intra frames, switching an inverse DCT stage of the decoding process to discard DCT coefficients representing low complexity areas of the intra frames.

8. The method of claim 1, wherein the switching for the identified reference frames comprises:
   if the identified reference frames are predicted frames and/or bidirectional frames,
   switching an inverse DCT stage of the decoding process to flag DCT coefficients representing low complexity areas of the predicted and/or bidirectional frames, and
   copying data from a previously decoded reference frame according to the flagged DCT coefficients into the predicted and/or bidirectional frames.

9. The method of claim 1 further comprising:
   identifying with the computed perceptual masking measures, a portion of the coded video data for which a lower performance level would be appropriate;
   signaling to a subsequent decoding stage that a lower performance level should be used during the decoding process for the identified portion.

10. The method of claim 1, further comprising:
    decoding the coded video data at a standard performance level if the computed perceptual masking measures do not indicate that the reference block has low complexity.

11. The method of claim 1, wherein said computing further comprises, for reference data in the coded video data, setting the perceptual masking measure to indicate that errors introduced into the coded video data when decoded at a lower performance level are not acceptable.

12. The method of claim 1, wherein the lower performance level includes omitting a stage of the multi-stage decoding process for the coded video data.

13. A decoder, comprising:
    an input device to receive coded video data;
    a processor to compute perceptual masking measures for the coded video data, based on the computed perceptual masking measures, to insert a flag into the coded video data to signal that a lower performance level should be used during decoding, to identify reference frames with fewer than a predetermined number of dependent frames from among the coded video data, and based on the flag, to reduce performance of stages of the decoder for the identified reference frames, wherein a perceptual masking measure indicates that errors introduced into the coded video data when decoded at a lower performance level are acceptable; and an output device to display decoded video data.

14. The decoder of claim 13, wherein the processor is to reduce performance of a loop filtering stage of the decoder to ignore blocking artifacts in the coded video data.

15. The decoder of claim 13, wherein the processor is to reduce performance of an inverse DCT stage of the decoder to discard low information DCT coefficients of the coded video data.

16. The decoder of claim 13, wherein the processor is to reduce performance of a motion compensation stage of the decoder to copy data from a previously decoded frame rather than calculate motion displacement of the copied data in the coded video data.

17. The decoder of claim 13, wherein the processor is to reduce performance of an inverse DCT stage of the decoder to discard DCT coefficients representing low complexity areas of the coded video data.

18. The decoder of claim 13, wherein the processor is to reduce performance of an inverse DCT stage of the decoder to copy data from a previously decoded frame rather than decode DCT coefficients representing low complexity areas of the copied data in the coded video data.

19. The decoder of claim 13, wherein the processor is to reduce performance of stages of the decoder for reference frames of the coded video data, the reference frames having fewer than a predetermined number of dependent frames.

20. The decoder of claim 13, wherein the processor is to set a flag in the coded video data and cause the stages to reduce performance when the stages process the flagged coded video data.

21. The decoder of claim 13, wherein the processor is to send a control signal to the stages to reduce performance when the stages process the coded video data.

22. A method for decoding coded video data, comprising:
computing with a decoder, perceptual masking measures for coded video data, wherein a perceptual masking measure indicates that errors introduced into the coded video data when decoded at a lower performance level are acceptable;
selecting, from the coded video data, at least one of non-reference frames, intra frames with less than a predetermined number of dependent frames, or reference frames with less than the predetermined number of dependent frames to which to apply the perceptual masking measures;
applying perceptual masking measures to the selected frames of the coded video data with the decoder;
inserting, with the decoder, a flag into the coded video data to signal to the decoding stage that a lower performance level should be used during the decoding process; and
based on the flag, adjusting decoder performance for the selected frames to which the perceptual masking measures were applied.

23. The method of claim 22, wherein the adjusting comprises:
adjusting the decoder to ignore some of the coded video data of the selected frames.

24. The method of claim 22, wherein the adjusting comprises:
adjusting the decoder to skip decoding of the selected frames.

25. The method of claim 22, wherein the perceptual masking measures indicate where or when to introduce noise into the coded video data while maintaining acceptable video quality of the coded video data.

\* \* \* \* \*